US012647423B2

(12) United States Patent
Wahnström et al.

(10) Patent No.: US 12,647,423 B2
(45) Date of Patent: Jun. 2, 2026

(54) OPEN ID CONNECT ELECTRONIC ACCESS CONTROL SYSTEM

(71) Applicant: Axis AB, Lund (SE)

(72) Inventors: Johnny Wahnström, Lund (SE); Mustafa Albayati, Lund (SE); Aslan Murjan, Lund (SE)

(73) Assignee: Axis AB, Lund (SE)

( * ) Notice: Subject to any disclaimer, the term of this patent is extended or adjusted under 35 U.S.C. 154(b) by 227 days.

(21) Appl. No.: 18/531,975

(22) Filed: Dec. 7, 2023

(65) Prior Publication Data

US 2024/0205225 A1 Jun. 20, 2024

(30) Foreign Application Priority Data

Dec. 20, 2022 (EP) ..................................... 22214794

(51) Int. Cl.
*H04L 9/40* (2022.01)
(52) U.S. Cl.
CPC .................................. H04L 63/101 (2013.01)
(58) Field of Classification Search
CPC ...................................................... H04L 63/101
See application file for complete search history.

(56) References Cited

U.S. PATENT DOCUMENTS

2014/0075513 A1* 3/2014 Trammel ................. G06F 21/41
726/4
2018/0048640 A1 2/2018 Johansson et al.

2018/0063153 A1 3/2018 Zhu et al.
2018/0075231 A1* 3/2018 Subramanian ...... H04L 63/0807
2019/0238598 A1* 8/2019 Mohamad Abdul .........................
H04L 63/0807
2020/0169549 A1* 5/2020 Smith .................... H04L 63/101
2023/0275893 A1* 8/2023 Sharma ............... H04L 63/0807
726/9
2023/0396618 A1* 12/2023 Kumar .................. H04L 63/105
2023/0421583 A1* 12/2023 Olden ................. H04L 63/1416
2024/0205225 A1* 6/2024 Wahnström ......... H04L 63/0815

OTHER PUBLICATIONS

Extended European Search Report issued on Jun. 13, 2023 for European Patent Application No. 22214794.4.

* cited by examiner

*Primary Examiner* — Harris C Wang
(74) *Attorney, Agent, or Firm* — Volpe Koenig

(57) ABSTRACT

There is provided an electronic access control system for a device. An OACS gateway is configured to obtain, via an OACS client, a request for the OACS gateway to issue a service ticket for a user agent. The OACS gateway is configured to retrieve, via an OIDC client, a profile for the user agent and an access control list for a profile and a device from the OIDC provider. The OACS gateway is configured to, responsive to having confirmed, by checking an access control list for the profile and the device, and by checking the profile itself, that the profile fulfils a permission to access a service on the device, generate a service ticket that validates the user agent for a one-time access to the service. The OACS gateway is configured to provide, via the OACS client, the service ticket towards the user agent.

13 Claims, 13 Drawing Sheets

160

170

100

180

User

Admin

LAN          140

120

110

Forward
Proxy

ADM/ACS          130

TLS

OIDC
Provider

150

OPEN ID CONNECT ELECTRONIC ACCESS CONTROL SYSTEM

TECHNICAL FIELD

Embodiments presented herein relate to techniques for operating an electronic access control system for a device.

BACKGROUND

In general terms, the term access control (AC) refers to the selective restriction of end-user access to a place or other resource, such as service or a device. Here, the actual act of accessing a place or other resource may mean entering a premises, consume, or retrieve, some data, or using, or configuring, some device, etc. Permission to access a resource is referred to as authorization. Locks and login credentials are two analogous mechanisms of access control.

Techniques for electronic access control (EAC) use computers to solve the limitations of mechanical locks and keys. A wide range of credentials can be used to replace mechanical keys. The electronic access control system grants access to an end-user based on the credential presented. When access is granted, a door can be unlocked for a predetermined time, or the end-user might access some requested data or a service. When access is refused, the door remains locked, or the end-user is prevented from accessing the requested data or service.

A credential is a physical/tangible object, a piece of knowledge, or a facet of a person's physical being that enables an individual access to a given physical facility or computer-based information system.

For local role-based electronic access control systems, a representation of the credentials is required to be directly installed on each individual device for which access is controlled. This is needed in order to make it possible to check the credentials presented by the end-user when access control is performed. For example, a value derived from the credentials using a one-way transformation function, such as a cryptographic hash function, is stored. Further, the limited number of different selectable roles does not allow for the access rights to be finetuned. Still further, the roles are not only limited in number, but they are fixed and unchangeable.

SUMMARY

An object of embodiments herein is to address the above-noted shortcomings of role-based electronic access control systems.

According to a first aspect there is presented an electronic access control system for a device. The electronic access control system comprises an OACS client and an OACS gateway to an OIDC provider. The OACS gateway implements an OIDC client. The OACS gateway is configured to obtain, via the OACS client, a request for the OACS gateway to issue a service ticket for a user agent. The request comprises an indication that the user agent requests to access a service on the device. The service is associated with a permission. The OACS gateway is configured to retrieve, via the OIDC client, a profile for the user agent and an access control list for the profile and the device from the OIDC provider. The OACS gateway is configured to, responsive to having confirmed, by checking the access control list for the profile and the device, and by checking the profile itself, that the profile fulfils the permission to access the service on the device, generate a service ticket that validates the user agent for a one-time access to the service. The service ticket is a token that is signed by the OACS gateway. The OACS gateway is configured to provide, via the OACS client, the service ticket towards the user agent.

According to a second aspect there is presented a method for operating an electronic access control system for a device. The electronic access control system comprises an OACS client and an OACS gateway to an OIDC provider. The OACS gateway implements an OIDC client. The method is performed by the OACS gateway. The method comprises obtaining, via the OACS client, a request for the OACS gateway to issue a service ticket for a user agent. The request comprises an indication that the user agent requests to access a service on the device. The service is associated with a permission. The method comprises retrieving, via the OIDC client, a profile for the user agent and an access control list for the profile and the device from the OIDC provider. The method comprises, responsive to having confirmed, by checking the access control list for the profile and the device, and by checking the profile itself, that the profile fulfils the permission to access the service on the device, generating a service ticket that validates the user agent for a one-time access to the service. The service ticket is a token that is signed by the OACS gateway. The method comprises providing, via the OACS client, the service ticket towards the user agent.

According to a third aspect there is presented a computer program for operating an electronic access control system for a device. The electronic access control system comprises an OACS client and an OACS gateway to an OIDC provider. The OACS gateway implements an OIDC client. The computer program comprises computer code which, when run on processing circuitry of the OACS gateway, causes the OACS gateway to perform actions. One action comprises the OACS gateway to obtain, via the OACS client, a request for the OACS gateway to issue a service ticket for a user agent. The request comprises an indication that the user agent requests to access a service on the device. The service is associated with a permission. One action comprises the OACS gateway to retrieve, via the OIDC client, a profile for the user agent and an access control list for the profile and the device from the OIDC provider. One action comprises the OACS gateway to, responsive to having confirmed, by checking the access control list for the profile and the device, and by checking the profile itself, that the profile fulfils the permission to access the service on the device, generate a service ticket that validates the user agent for a one-time access to the service. One action comprises the OACS gateway to provide, via the OACS client, the service ticket towards the user agent.

According to a fourth aspect there is presented a computer program product comprising a computer program according to the third aspect and a computer readable storage medium on which the computer program is stored. The computer readable storage medium could be a non-transitory computer readable storage medium.

Advantageously, these aspects overcome the above-noted shortcomings of role-based electronic access control systems.

Advantageously, these aspects enable new roles to be created.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

Figure 1:
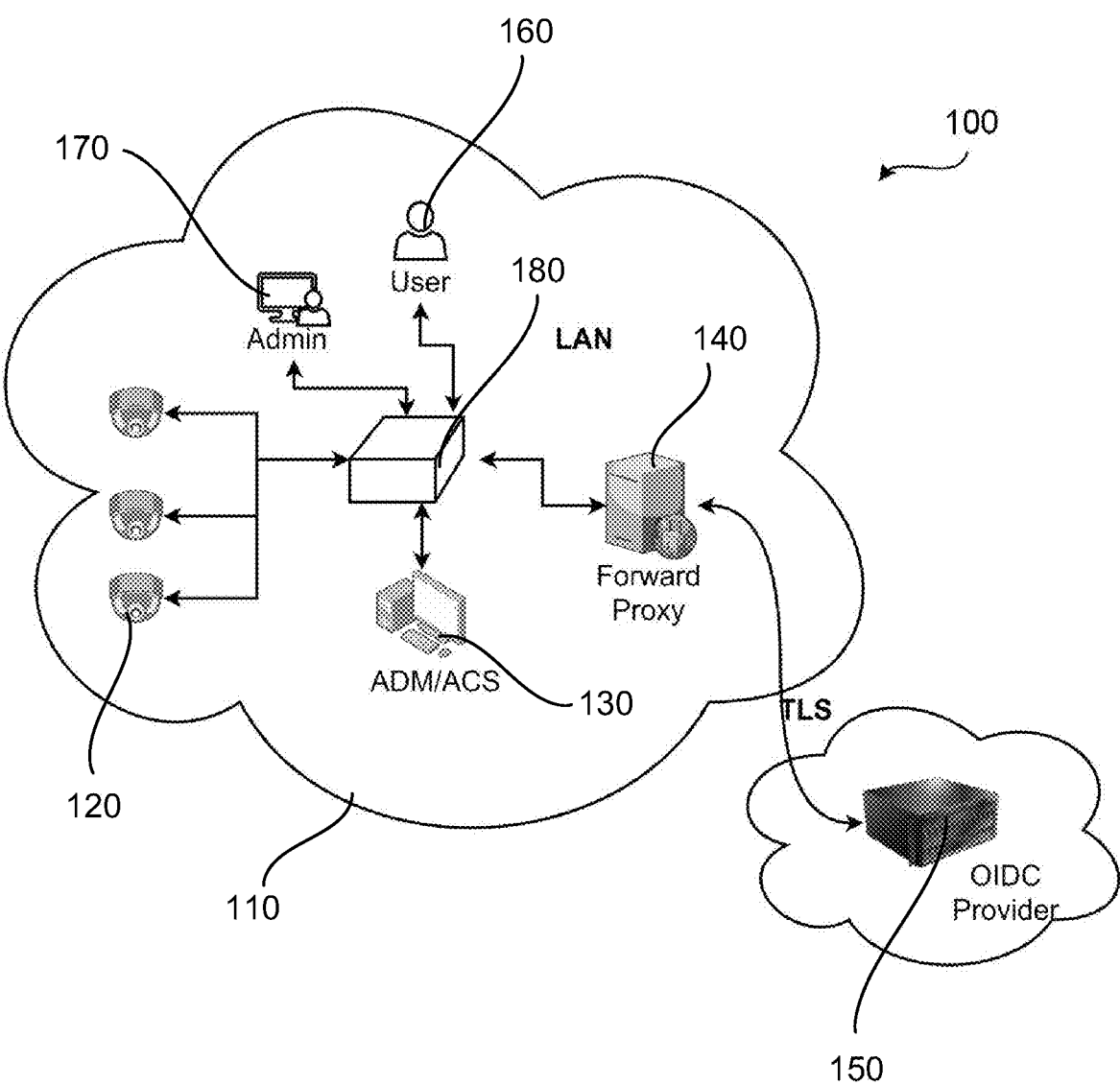
FIG. 1 is a schematic diagram illustrating a network architecture according to embodiments.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Definitions

The following definitions (as alphabetically listed) will be useful in the following description.

Access Token: a token for authorization to a specific resource.

Claim: a statement about a scope. It can be dynamically assigned from an external source or be statically mapped.

Client Key: a persistent private key used to sign tokens for client authentication. The public part of the client key is registered for the client by the OIDC provider.

D-Bus: an inter-process communication protocol.

External Service: any service that can be accessed from outside the device.

JWT: a JSON (JavaScript Object Notation) Web Token.

OACS: short for OIDC Electronic access control system, implementing a profile-based access control solution using JWTs.

OACS Conf: a configuration file used by the OACS gateway to connect to the OIDC Provider and verify the access token.

OACS gateway: an entity configured to handle user authentication, profile authorization and service tickets.

OACS gateway key: A temporary symmetric key generated on runtime to sign service tickets.

OIDC: short for Open ID Connect, an identity layer on top of the OAuth 2.0 protocol for authentication and authorization.

OIDC Client: a registered entity (e.g., implemented in software) that is authorized to communicate with the provider on behalf of the end-user to handle end-user authentication and authorization.

OIDC Client ID: A unique user-defined name to identify the OIDC client registered on the provider.

OIDC Client key: A private key used (instead of a client secret) to sign single-use authentication tokens.

OIDC Client secret: A predefined secret used during client authentication.

OIDC Provider: an OpenID Connect 1.0 certified service provider.

Profile: a set of features defined as a scope in OAuth 2.0 with the targeted OACS version.

Refresh Token: a token for authorization to retrieve a new access token from the provider without user interaction. This allows providers to use short-lived access tokens without having to involve the end-user when the access tokens expire.

RoT: short for Root of Trust, a cryptographic entity, such as a Trusted Platform Module (TPM) or a Secure Element (SE), that can securely store keys and sign data.

Scope: a grouping of claims.

Service Ticket: a data structures required by the OACS gateway to authorize a task. Could be provided as a base64 encoded JWT.

User Agent: any type of external front-end entity configured to handle end-user authentication, authorization and ticket retrieval by communicating through the OACS Client.

Zone: A group of regionally related devices.

Resources

The following resources (as alphabetically listed) as accessible to the following will be useful in the following description.

access.h: used by services to verify access rights using predefined authorization requirements.

client.h: an abstraction layer to handle communication with the OACS gateway service. Defines a communication handler function pointer, that is used by client functions to relay requests to the OACS gateway. The client functions crafts request objects that are than serialized for transfer over any inter process communication protocol using a corresponding communication handler function.

liboacs: a C library used by the OACS gateway to handle authentication of end-users and authorization of profiles. Also used by services to verify access rights and by external services to handle communication with the OACS gateway.

OACS gateway.h: comprises functions to initiate the internal OIDC Client and set parameters necessary for verification of access tokens. The OACS gateway functions use OAuth flows through HTTP API calls to handle user authentication and profile authorization. Additional functions exist for verification of access tokens, generation of service ticket and verification of service tickets.

permissions.h: provides a definition of the permission type and permission flags used by "OACS gateway.h" and "client.h". Services will use this flag to define authorization requirements for their APIs.

Network Architecture

In FIG. 1 is illustrated a network architecture 100 where the herein disclosed embodiments readily apply. A local area network (LAN) 110 comprises devices 120, such as cameras, a management entity 130 for an administration (adm) and access control system (ACS), and a forward proxy 140 to communicate with an OIDC provider 150, end-users 160 and system administrators 170. The entities in the LAN are operatively connected through a connection point 180. Each device acts as its own OIDC client using the same OIDC client ID and OIDC client key. The client ID and client key need to be installed on the devices during setup before use, or else the client authentication against the OIDC provider will fail. The client key needs to be stored in a tamper proof device to establish a root of trust. With devices as clients, tokens will travel less over the LAN and also, there will not be a central server acting as a OIDC client back-end, that can become a potential single point of failure or a bottleneck that congests the traffic to the devices. Each device should be configured to apply encryption to external communication for protection and to prevent tokens from getting leaked.

Profile

A profile is defined as a set of features representing operations that the device can perform together with its authorized permissions. These features can be native features provided directly by a service, pseudo features defined by a specific use of another native feature, or composite features that are a combination of two or more features. A native feature in this case could be to play an audio resource in a network speaker or start recording video in a security camera. A pseudo feature can be for that network speaker to play the sound of a fire siren as a fire alarm feature. No combination of features should occur. If a procedure would require the use of two or more features, then a new composite feature should be defined. In this way, the service can allow access to single features without the concern of all the possible combinations. Each feature will have one or more of the following permissions, "run", "conf", "priv". If the end-user sends a request to perform a task, then the request must require the "run" permission, whilst the "conf" permission is used to configure the task. The "priv" permission can be used in combination with "run" and "conf" for elevated privilege requirements, such as privileged executions or configurations. The permissions can be represented as a JSON list of strings. An optional "target" field exists in the profile to determine the target platform of the profile, as different features exist for cameras and speakers. Alternatively, the same feature could have different uses depending on the target platform. Because of this ambiguity, the target field should be used in order to prevent malicious misuse, as a feature on a speaker could potentially result in elevated access on a camera. If features are deemed platform specific or unique enough, then this field can be opted out.

Zone

Zones are definitions regarding a group of devices. It utilizes the "aud" claim defined by OAuth 2.0 to target a specific audience. The audience can be a specific application or service when used with cloud services. As used herein, the audience claim refers to a zone defined by the system admin. The "aud" option is added to the configuration when setting up the device. The system administrator can create a new zone by creating a new zone scope and then configuring a set of devices to accept that zone as the intended audience. When an end-user then logs in on a device in a particular zone, the device will insert its zone into the authorization request as a scope. After a successful authentication, a refresh token will be authorized with a profile intended for that audience. This refresh token will only be accepted in that zone, isolating different zones from each other.

Access Control List

An access control list (ACL) can be represented by a scope for a given profile on a given device. To add a profile to a device, such a scope can be created using the device's serial number and the profile scopes name, in order to bind the two of them together. The entries in these scopes can, for example, be the email address of the end-users, which correspond to the email claim in the default email scope. The entry values are expiration date-times for temporary access to a profile. In this way, an elevated access profile, such as "technician" can be assigned for a few hours to days and be inaccessible for the end-user when expired. An empty string can be used for persistent access to the profile. If a wildcard, represented by "*" is used on a profile, any user can use that profile on that device without being explicitly assigned. In that case, any user added to the list will instead get black-listed. An ACL can also be defined for a zone, in order to assign a profile and authorize users for a group of devices, instead of configuring individual ACLs. For instance, an "m_building" zone can be defined to include all the devices in that building. The devices would then be configured with "m_building" as audience during setup. The ACL would be bound to a profile that would then either individually authorize users for all the devices on that building or everyone using the wildcard user.

Operator Profile Examples

Figure 2:
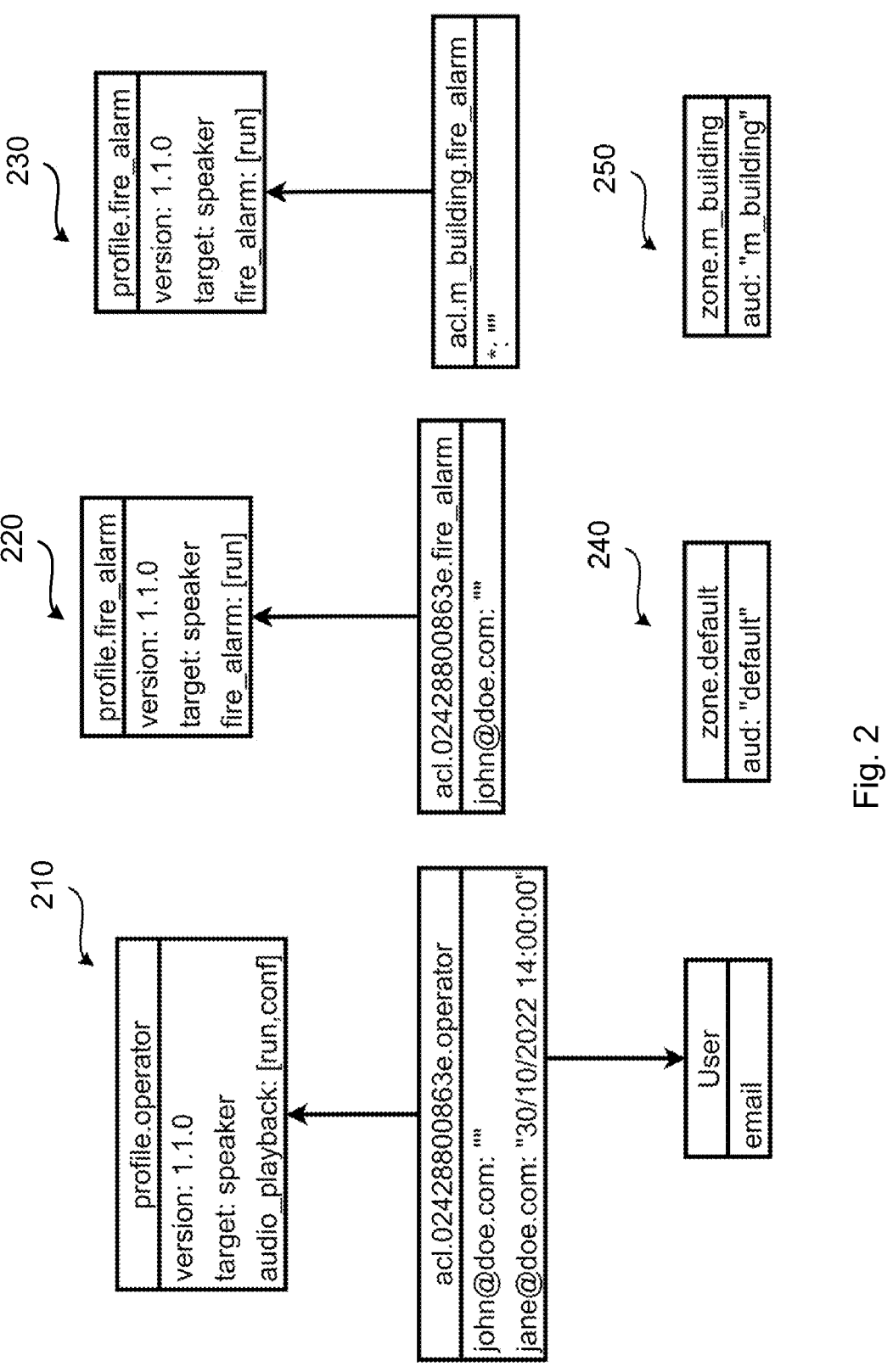
FIG. 2 schematically illustrates examples of operator profiles according to an embodiment.

In FIG. 2 is illustrated three examples of operator profiles.

The first example illustrates an operator profile 210 targeting speakers, with an audio_playback feature set to "run" and "conf" permissions. This profile can thus be used to run and/or configure an audio playback task. The profile, however, cannot be employed to perform privileged task, the "priv" permission is missing'. An ACL is also present for this profile defined on a device with "02428800863e" as serial number. An end-user with email address "john@doe.com" has been given access using an empty string, which implies persistent access, whilst an end-user with email address "jane@doe.com" has a temporary access until 30 Nov. 2022. This profile is thus explicitly assigned on that particular device. A default zone is defined and can be used by devices that are configured to accept "default" as the intended audience.

The second example illustrates an operator profile 220 in terms of a fire alarm profile with the "fire_alarm" pseudo feature set to "run" permission. Together with an ACL for the profile on a device with "02428800863e" as serial number, this ACL assigns an end-user with email address "john@doe.com" persistent access to the "fire_alarm" profile. This user can now use the "fire_alarm" profile to trigger the fire alarm.

The third example illustrates an alternative approach to the second example. In this case, an operator profile 230 representing the "fire_alarm" profile is assigned to the entire "m_building" zone without creating explicit ACL for each device. Together with the wildcard user, any authorized user can start the fire alarm on any device in that zone.

Scopes 240, 250 comprise the "aud" claim. They are requested together with the profiles and access control lists, thus adding the "aud" claim into the resulting token. The zone name in an "aud" claim is then used by the OIDC client when the access token is verified. Tokens that do not belong to the devices zone are discarded before anything else is done. The "default" zone is configured by default.

OACS Architecture

Figure 3:
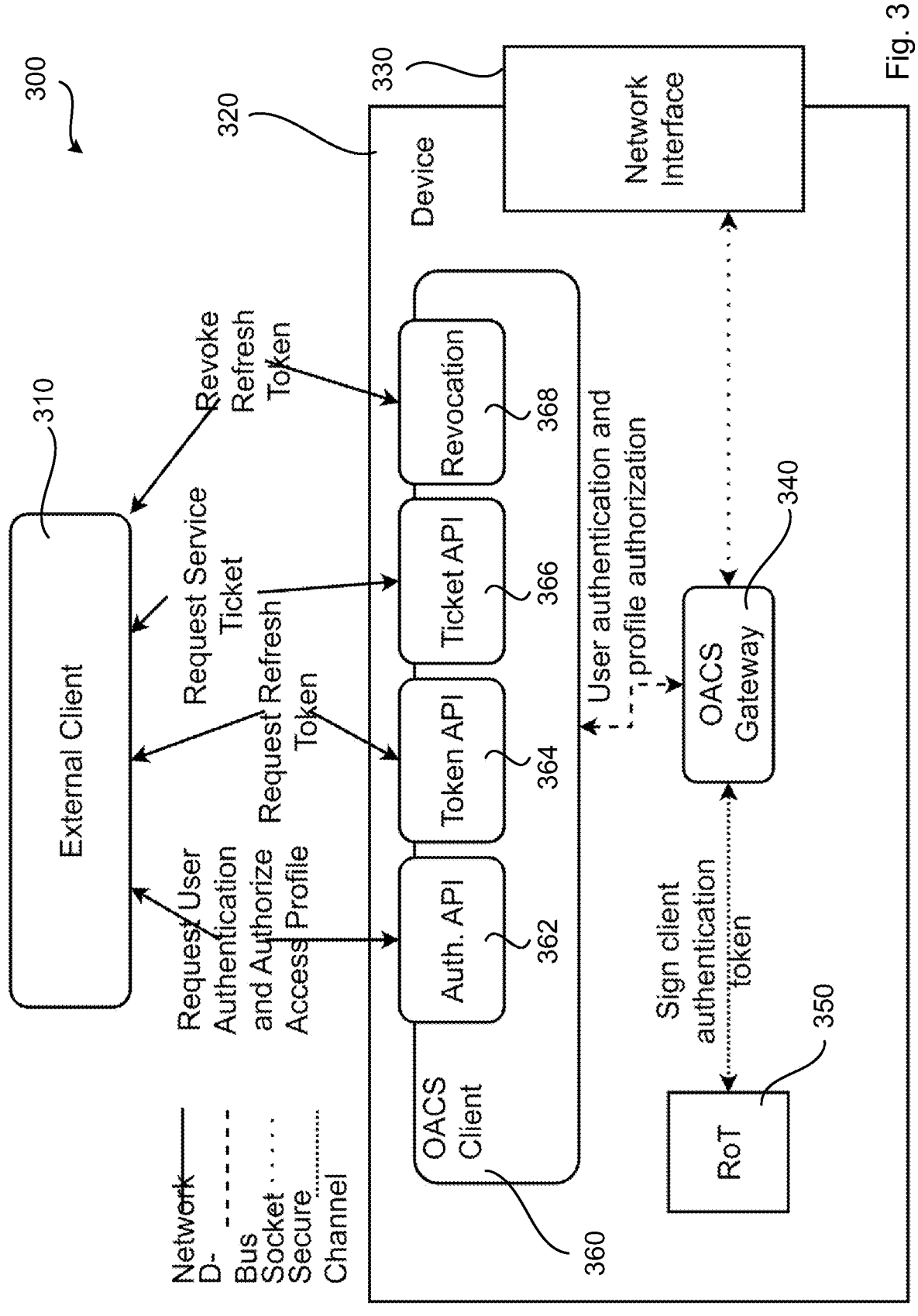
FIG. 3 schematically illustrates an example OACS architecture according to an embodiment.

In FIG. 3 is provided an example OACS architecture 300 according to which a device 320 is configured to communicate with an external client 310 over end-points. The OACS utilizes four different public end-points 362, 364, 366, 368, as provided in an OACS client 360, to handle login (Authorization API, with request user authentication and authorize access profile), get access token (Token API, with request refresh token), authorize ticket (Ticket API, with request service ticket), and revocation of the refresh token (Revocation, with revoke refresh token). These end-points make use of the OACS library to communicate with the OACS gateway 340 over a D-Bus to serve requests. The OACS gateway further communicates with the RoT 350 to sign client authentication tokens as previously defined. The OACS gateway further has a connection to a network interface 330. The RoT protects the private key used for client authentication. The OACS gateway communicates directly with the OIDC Provider. The end-points act as entry points and potentially translate, or in other way handle, responses from the OACS gateway. The OACS Client acts as a relying party for the external client to establish communication with the OACS gateway. The OACS gateway D-Bus service will only be allowed to be used by the "oacs" group on the host operating system. Thus, only external entry points in the system can process user access as intended, reducing the chances of exposure to a rogue service under the control of a malicious user.

In further detail, the OACS gateway is configured to read a configuration file (see below) and generate a temporary symmetric key. This key is used to bind a service ticket to a specific device, limiting the use of an authorized ticket to the device that authorized it. As the keys are randomly generated on each device, a compromised key will not affect other devices. In some examples, the key is a 256-bit secret that is updated once every six hours. This can ensure perfect forward secrecy. A more frequent update rate could increase the changes of a race condition due to use of tickets generated before key update. The end-user will be able to use the external Ticket API to request a service ticket to use a device feature with authorized permissions. A process belonging to the "oacs" group will be allowed to request the ticket from the OACS gateway, on behalf of the end-user, with the user's refresh token, the requested feature, and permissions for that requested feature. The refresh token will be used to request a new access token with the authorized access profile. The access rights to a profile will be verified by confirming that the end-user exists in the access control list for the authorized profile, on the target device. If the end-user is authorized to use the requested feature with the expected permissions, a new service ticket will be issued by the device signed using the symmetric key of the OACS gateway together with a new refresh token using refresh token rotation.

Service Ticket

Figure 4:
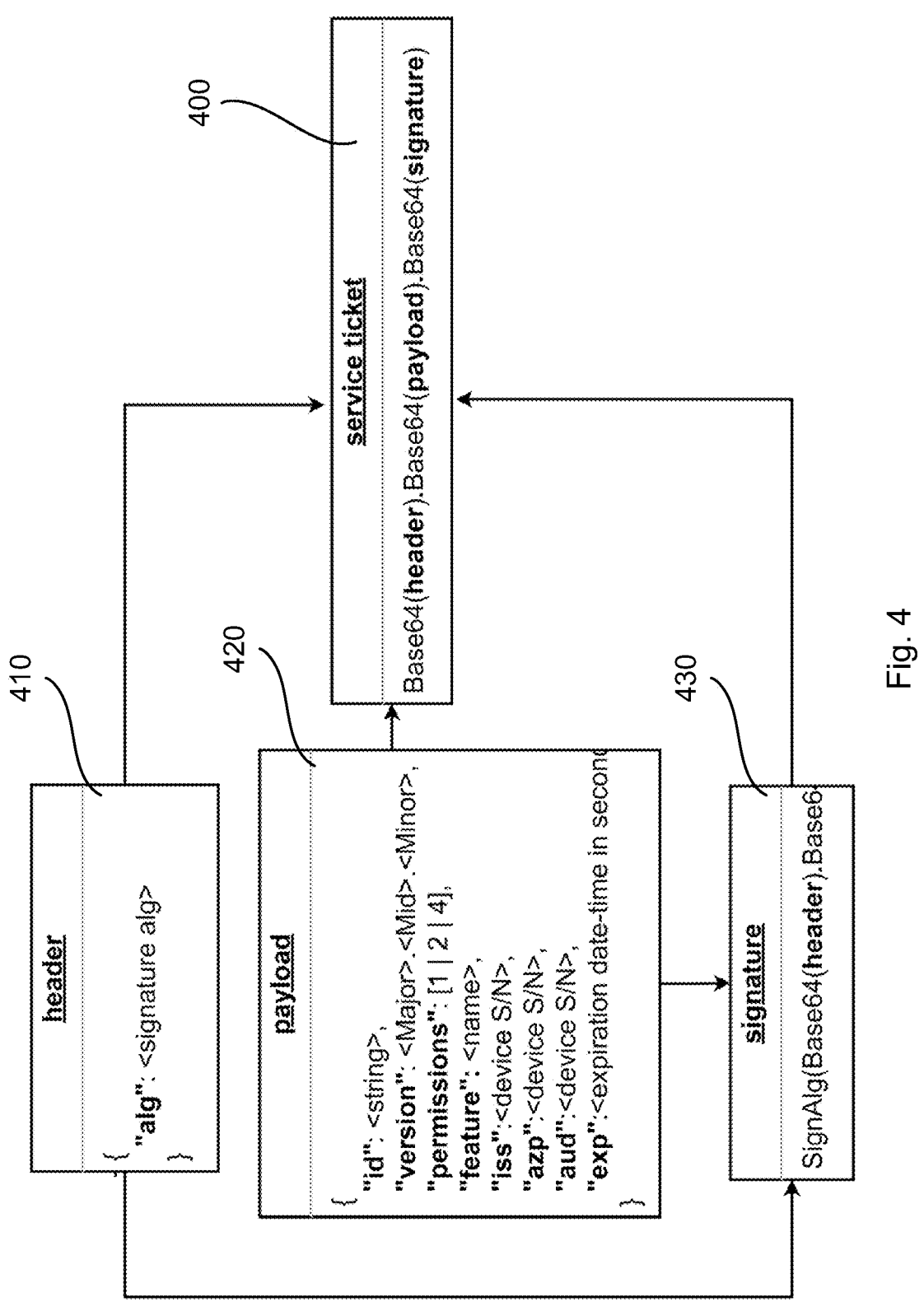
FIG. 4 schematically illustrates an example of a service ticket according to an embodiment.

In FIG. 4 is provided an example of a service ticket 400. As illustrated, the service ticket is composed of a header part 410, a payload part 420, and a signature part 430. A service ticket is an authorization by the OACS gateway to perform a task given that the end-user has the right permissions. The "id" key is a string used to identify the ticket and ensure that the ticket is used only once. The "version" key is used to assess the compatibility of the defined profile with device services. The "feature" key is the request feature defined in the target feature set. The "permissions" key is used to determine the authorized permission for the requested feature. If the end-user is authorized to perform the task, a new short-lived service ticket is generated. The ticket will be bound by the serial number of the device that authorized the use, given by the "iss", "azp" and "aud" claims together with an expiration time. The ticket is then signed by the device, binding it and limiting its use to a single feature on a single device.

Figure 5:
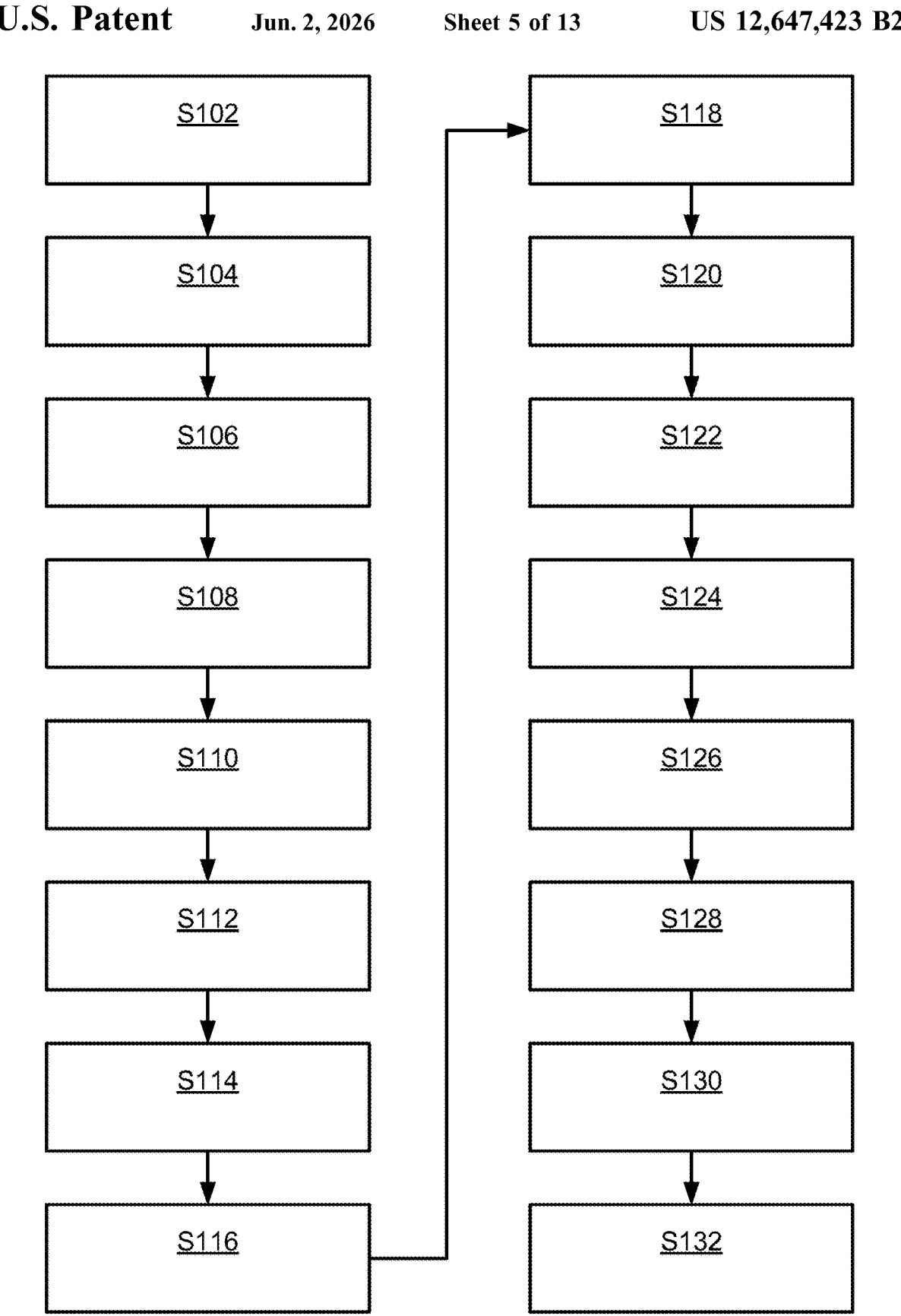
FIG. 5 is a flowchart of methods according to embodiments.

A method for operating an electronic access control system 920 for a device 910 will be disclosed next with reference to the flowchart of FIG. 5. The electronic access control system 920 comprises an OACS client 922 and an OACS gateway 924 to an OIDC provider 940. The OACS gateway 924 implements an OIDC client 926. The electronic access control system 920 might be provided in the device 910. The methods are performed by the OACS gateway 924. The methods are advantageously provided as computer programs. It is here noted that the end-user throughput will be represented by the user agent 950 since the user agent 950 is the entity with which the end-user directly interacts with.

S116: The OACS gateway 924 obtains, via the OACS client 922, a request for the OACS gateway 924 to issue a service ticket for a user agent 950. The request comprises an indication that the user agent 950 requests to access a service on the device 910. The service is associated with a permission.

S118: The OACS gateway 924 retrieves, via the OIDC client 926, a profile for the user agent 950 and an access control list for the profile and the device 910 from the OIDC provider 940.

S120: The OACS gateway 924, responsive to having confirmed, by checking the access control list for the profile and the device 910, and by checking the profile itself, that the profile fulfils the permission to access the service on the device 910, generates a service ticket that validates the user agent 950 for a one-time access to the service. The service ticket is a token that is signed by the OACS gateway 924.

The service tickets might be signed by a temporary symmetric key generated by the OACS Gateway during runtime and kept in work memory. It can be regularly updated for perfect forward secrecy (if an old key is leaked, it cannot be used to forge new service tickets). The temporary nature and access limitations to the key solves a fundamental issue with symmetric keys, where sharing the symmetric key between two parties might cause the key to be obtained by an unauthorized third party. However, as the key is temporary and never shared with the client (but instead used by the OACS gateway for signing and validation purposes), the speed and low storage requirements of symmetric encryption can be utilized without any security implications.

S122: The OACS gateway 924 provides, via the OACS client 922, the service ticket towards the user agent 950.

Embodiments relating to further details of operating the electronic access control system 920 will now be disclosed with continued reference to FIG. 5.

Aspects of logging in the user will be disclosed next.

S102: The OACS gateway 924 obtains, via the OACS client 922, an authorization request for the user agent 950 responsive to the user agent 950 requesting to log in to the device 910.

S104: The OACS gateway 924 authenticates the OICD client 926 towards the OIDC provider 940 by providing, via the OIDC client 926, a signed token to the OIDC provider 940.

S106: The OACS gateway 924 obtains, via the OIDC client 926 and from the OIDC provider 940, a device code and a verification URL for the device 910. The verification URL comprises an embedded user agent code that is paired with the device code.

S108: The OACS gateway 924 provides, via the OACS client 922, the verification URL and the device code towards the user client for authenticating the user agent 950.

S110: The OACS gateway 924 obtains, via the OACS client 922, a request for a refresh token from the user agent 950. The request comprises the device code.

S112: The OACS gateway 924 retrieves, via the OIDC client 926, an access token and the refresh token for the user agent 950 from the OIDC provider 940 by providing the device code to the OIDC provider 940.

S114: The OACS gateway 924 provides, via the OACS client 922, the refresh token towards the user client.

Further aspects of handling service tickets will be disclosed next.

In some aspects, the request for the OACS gateway 924 to issue the service ticket comprises the refresh token.

In some aspects, a new refresh token is retrieved, via the OIDC client 926, from the OIDC provider 940 together with the profile. The new refresh token is provided, via the OACS client 922, together with the service ticket towards the user agent 950.

In some aspects, the new refresh token is retrieved upon having verified the profile of the user agent 950 on the access control list.

Aspects of logging out the user (whereby the refresh token is revoked) will be disclosed next.

S124: The OACS gateway 924 obtains, via the OACS client 922, a token revocation request for the user agent 950 responsive to the user agent 950 requesting to log out from the device 910. The token revocation request comprises the refresh token.

S126: The OACS gateway 924 authenticates the OIDC client 926 towards the OIDC provider 940 by providing, via the OIDC client 926, a signed token to the OIDC provider 940.

S128: The OACS gateway 924 provides, via the OIDC client 926, the refresh token and the signed token to the OIDC provider 940.

S130: The OACS gateway 924 obtains, via the OIDC client 926 and from the OIDC provider 940, a response indicating that the refresh token has been revoked.

S132: The OACS gateway 924 provides, via the OACS client 922, a response towards the user client that the refresh token has been revoked and that the user agent 950 is logged out.

Further aspects relating to logging in the user, handling service tickets, and logging out the user will be disclosed next.

User Login Process

Figure 6:
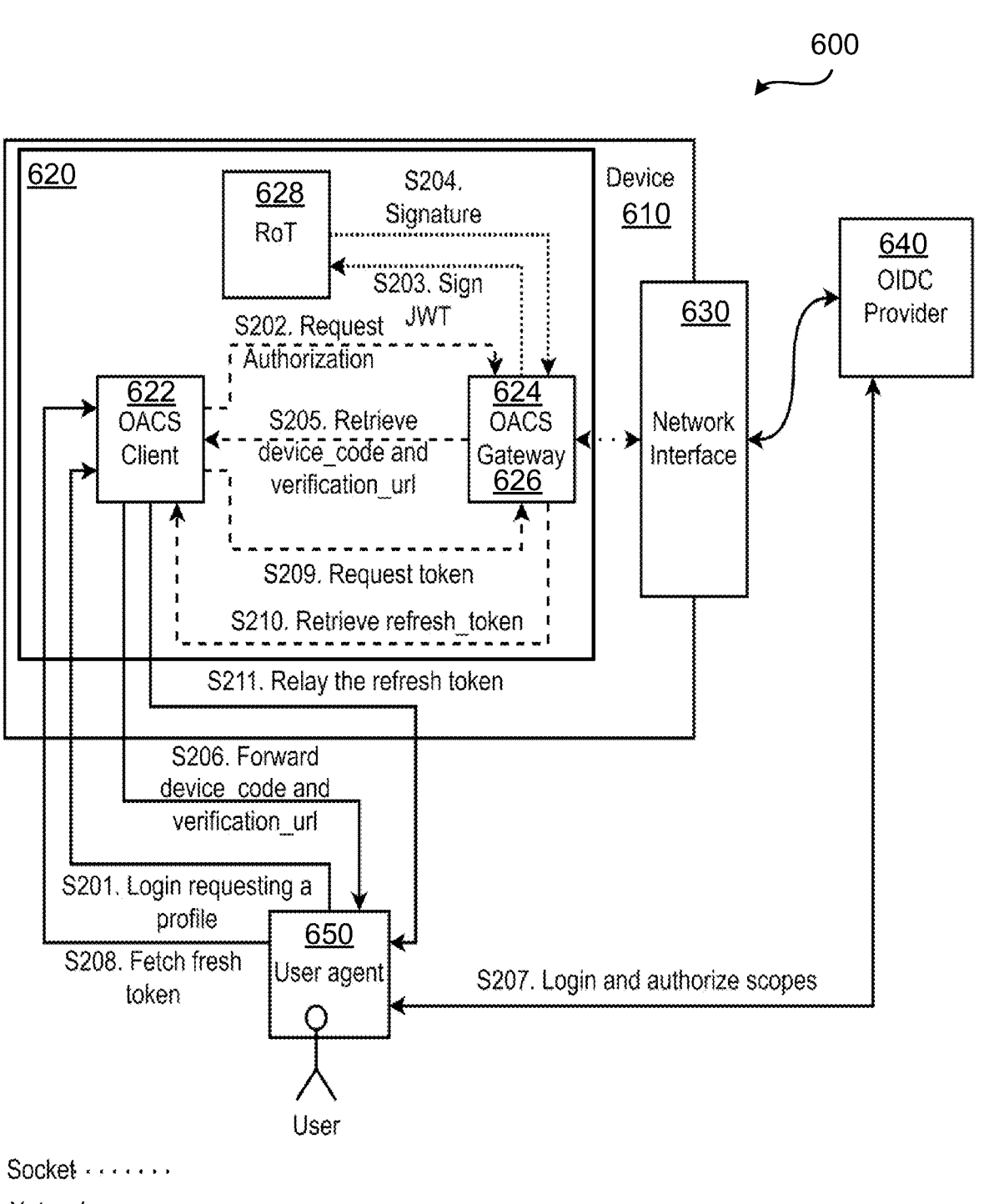
FIGS. 6, 8, and 11 are block diagrams according to embodiments.
Figure 7:
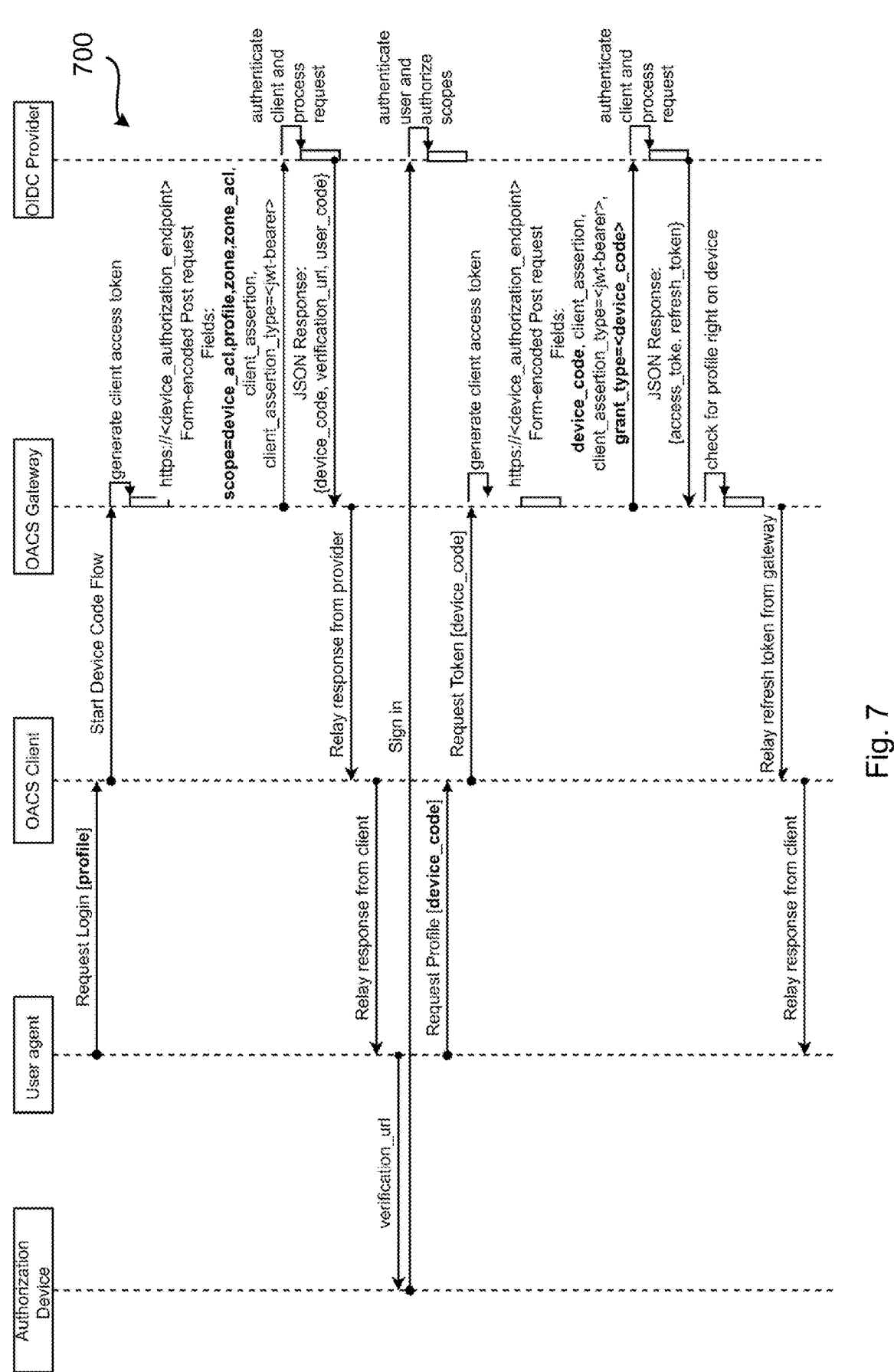
FIGS. 7, 9, 10, and 12 are signaling diagrams of methods according to embodiments.

Reference is made to the block diagram 600 of FIG. 6 and the signaling diagram 700 of FIG. 7. The device 610 comprises an electronic access control system 620. The OACS gateway 624 implements an OIDC client 626.

S201. Login requesting a profile: The user agent 650 requests the end-user to be logged in with a specific profile from the authorization endpoint.

S202. Request Authorization: The OACS Client 622 requests the OACS gateway 624 to initiate the login of the end-user by sending an authorization request to the device authorization endpoint with the requested profile, the devices corresponding profile ACL, the configured zone and the profile ACL of that zone, as scopes. The client authentication tokens header and payload are constructed and defined previously.

S203. Sign JWT: The OACS Client 622 generates a base64 encoded representation of the header and payload which is then signed by the RoT 628.

S204. Signature: The signature is returned and the signed JWT is assembled. This token can now be used to authenticate the OIDC client towards the OIDC provider 640 via network interface 630.

S205. Retrieve device_code and verification_url: If the OIDC client 626 is successfully authenticated, the OIDC provider's response will contain a device_code and verification_url. The verification_url has an embedded user_code which is paired with the device_code connects to the same session.

S206. Forward device_code and verification_url: The verification_url is forwarded to the user agent 650 for authentication of the user together with the device_code which will later be used to retrieve the issued refresh token.

S207. Login and authorize scopes: The user agent 650 is used to convey the verification_url to the user, which can be opened in a browser. This provides single-sign-on capabilities for headless devices, as the user is kept logged in via cookies set on the device used for authentication. The user_code and device_code are only valid for a short time period.

S208. Fetch fresh token: After successful user authentication the user agent 650 will request a refresh token authorizing the requested profile, using the device_code.

S209. Request token: The access_token and refresh_token are requested from the OIDC provider 640, by the device 610, using the device_code provided by the user agent. Steps S202 and S203 are repeated to generate the client authentication token.

S210. Retrieve the refresh_token: An access_token and refresh_token are retrieved from the OIDC provider 640. The user access right to the requested profile is confirmed by checking (in the OACS gateway 624) the device and zone ACLs of the profile. If the user has a valid entry in at least one of them, then the profile is permitted and the refresh_token is returned. Otherwise, an error message is returned.

S211. Relay the refresh token: The response is relayed to the user agent 650.

Ticket Handling Process

Figure 8:
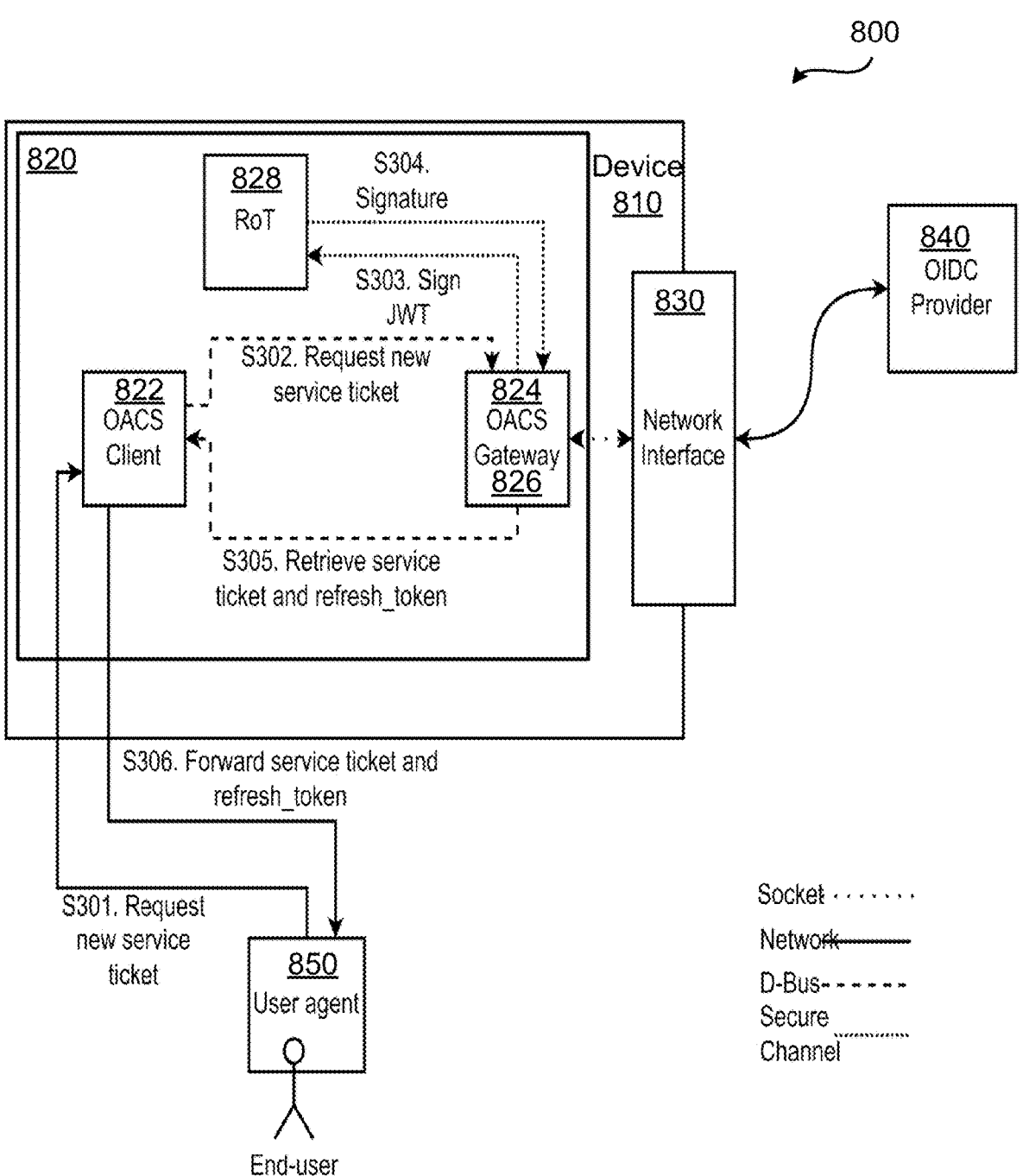
Figure 9:
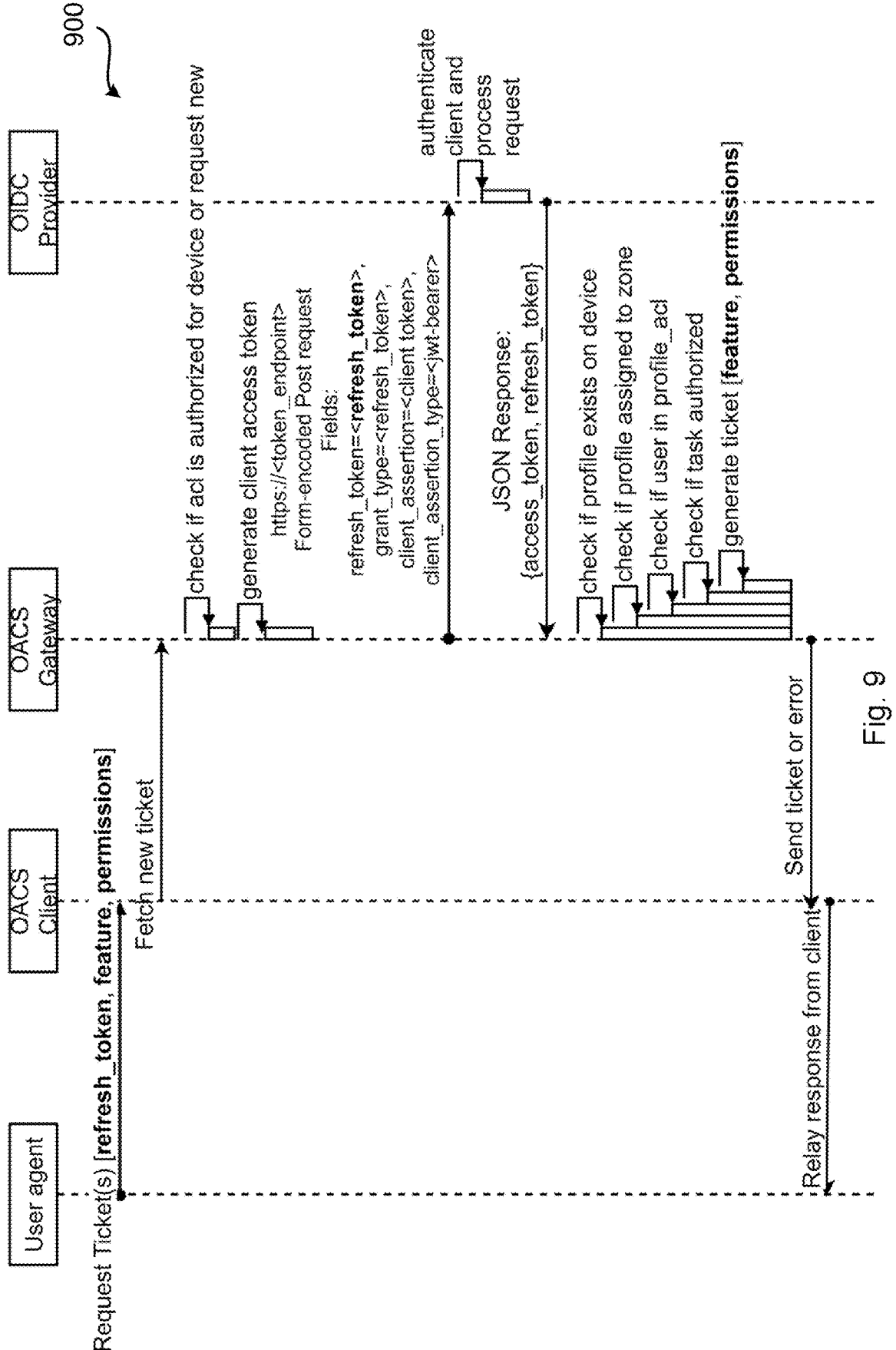
Figure 10:
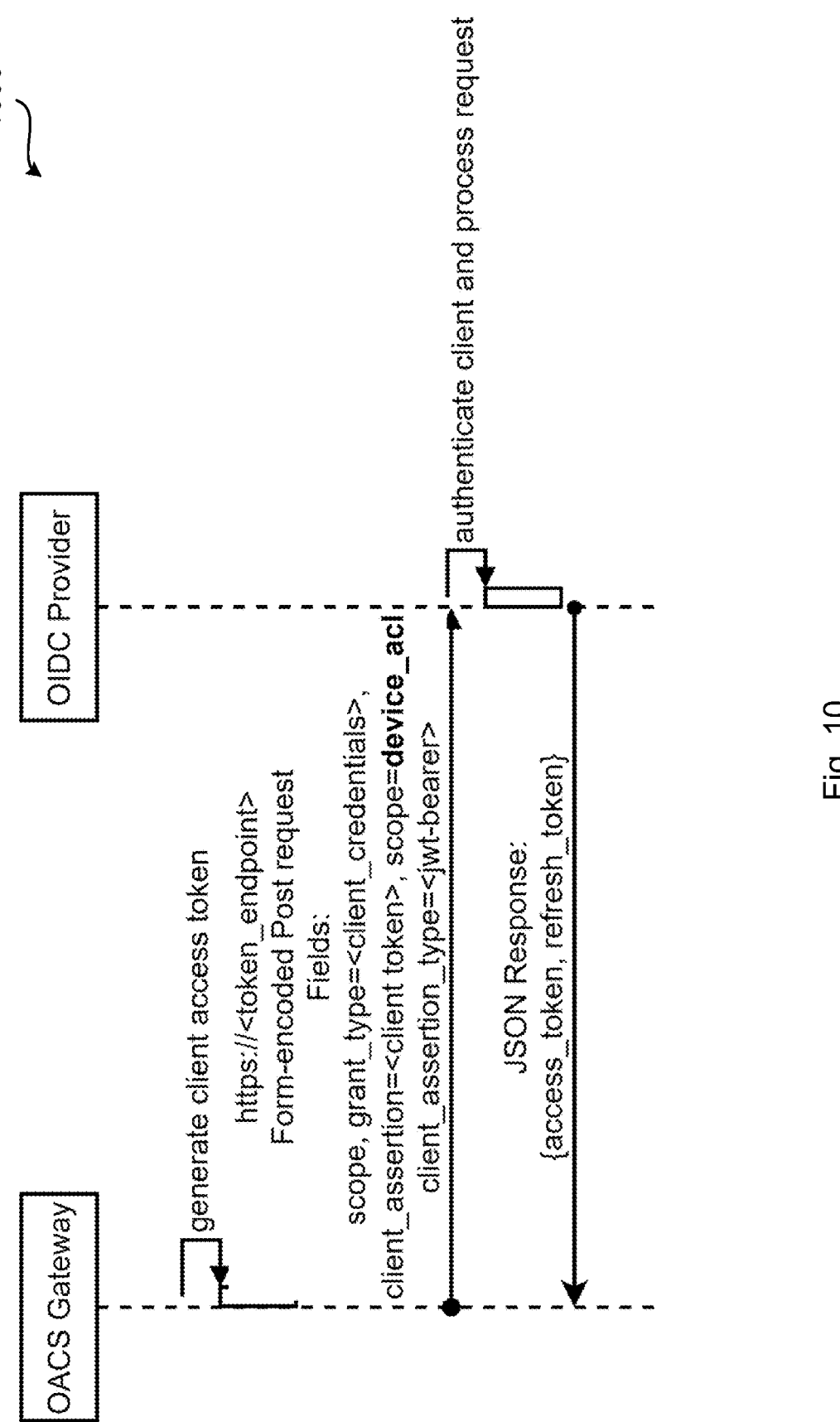

Reference is made to the block diagram 800 of FIG. 8 and the signaling diagrams 900, 1000 of FIG. 9 and FIG. 10. The device 810 comprises an electronic access control system 820. The OACS gateway 824 implements an OIDC client 826.

S301. Request new service ticket: The user-agent 850 requests a new ticket for a specific feature and permission, using its refresh token.

S302. Request new service ticket: The OACS client 822 requests the OACS gateway 824 to issue the service ticket. First, the profile and ACLs need to be retrieved.

S303. Sign JWT: The OIDC client 826 generates a base64 encoded representation of the header and payload which is then signed by the RoT 828.

S304. Signature: The signature is returned and the signed JWT is assembled. This token can now be used to authenticate the OIDC client 826 towards the OIDC provider 840 via network interface 830.

S305. Retrieve service ticket and refresh_token: If the refresh token was originally intended for the target device (authorized by user during login), then the service ticket will contain the profile ACL of the device. In that case, a new access token is requested from the OIDC provider 840 and the feature permissions are verified. If authorized, the new service ticket is signed and returned together with a new refresh token using refresh token rotation. If the device is not the originally intended target, device, the OACS gateway 824 will use the client credential procedure to fetch the profile ACL of the target device. If the user has right to use the authorized profile on the target device, the process precedes as in the previous case and the ticket authorization is performed. If the user is not explicitly blacklisted on the device, the zones profile ACL is checked as a fallback. If successful, a new service ticket is generated and issued.

S306. Forward service ticket and refresh_token: The ticket and refresh token are forwarded to the user-agent 850. If the authorized profile ACL does not belong to the target device, a Client Credential Grant is used to request the ACL for the authorized profile, on the behalf of the user agent 850. The Client Credential Grant is only authorized to access device ACLs. User authentication is needed to authorize profiles, as they are enforced using the user identity in ACLs.

User Logout Process

Figure 11:
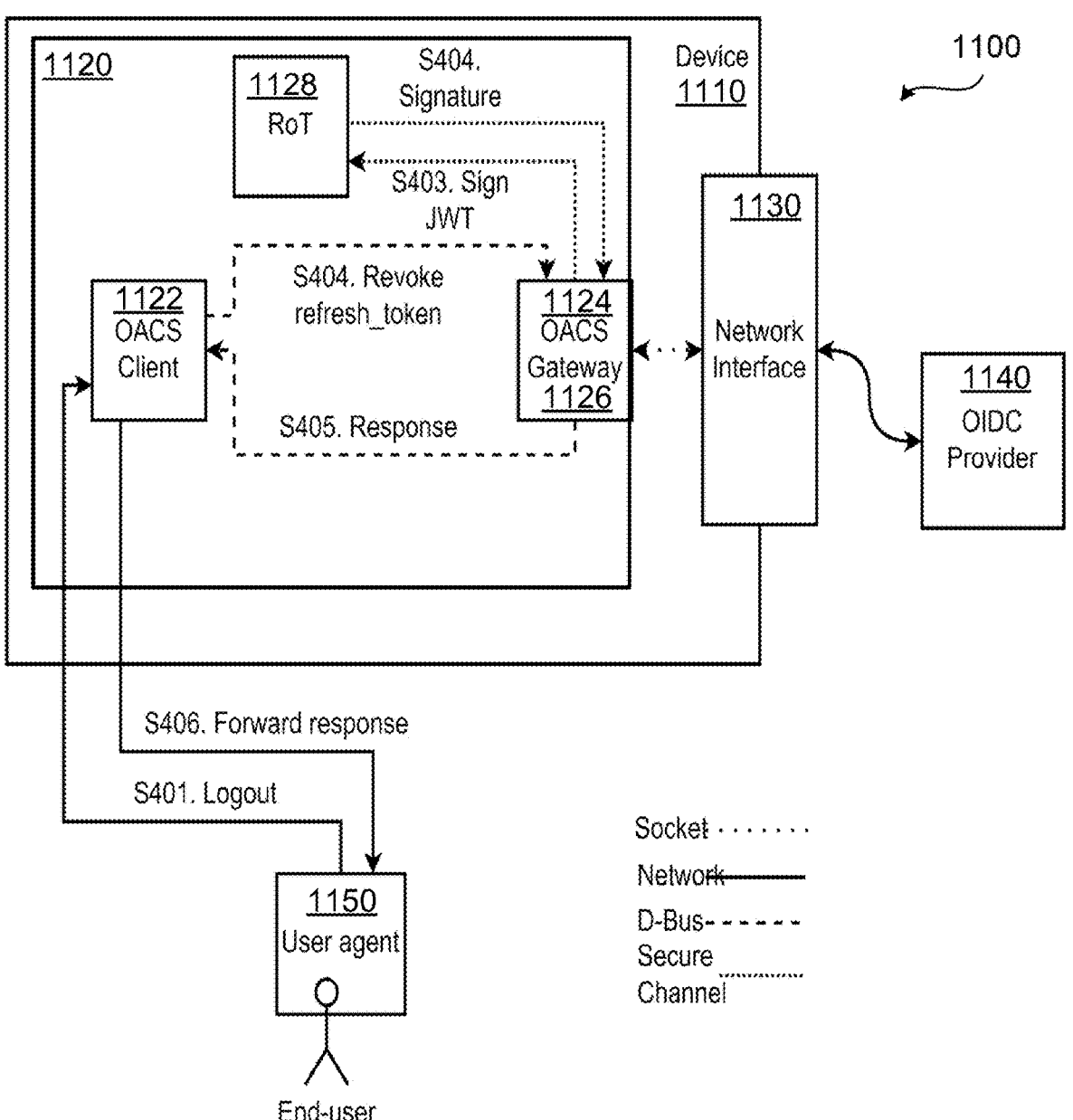
Figure 12:
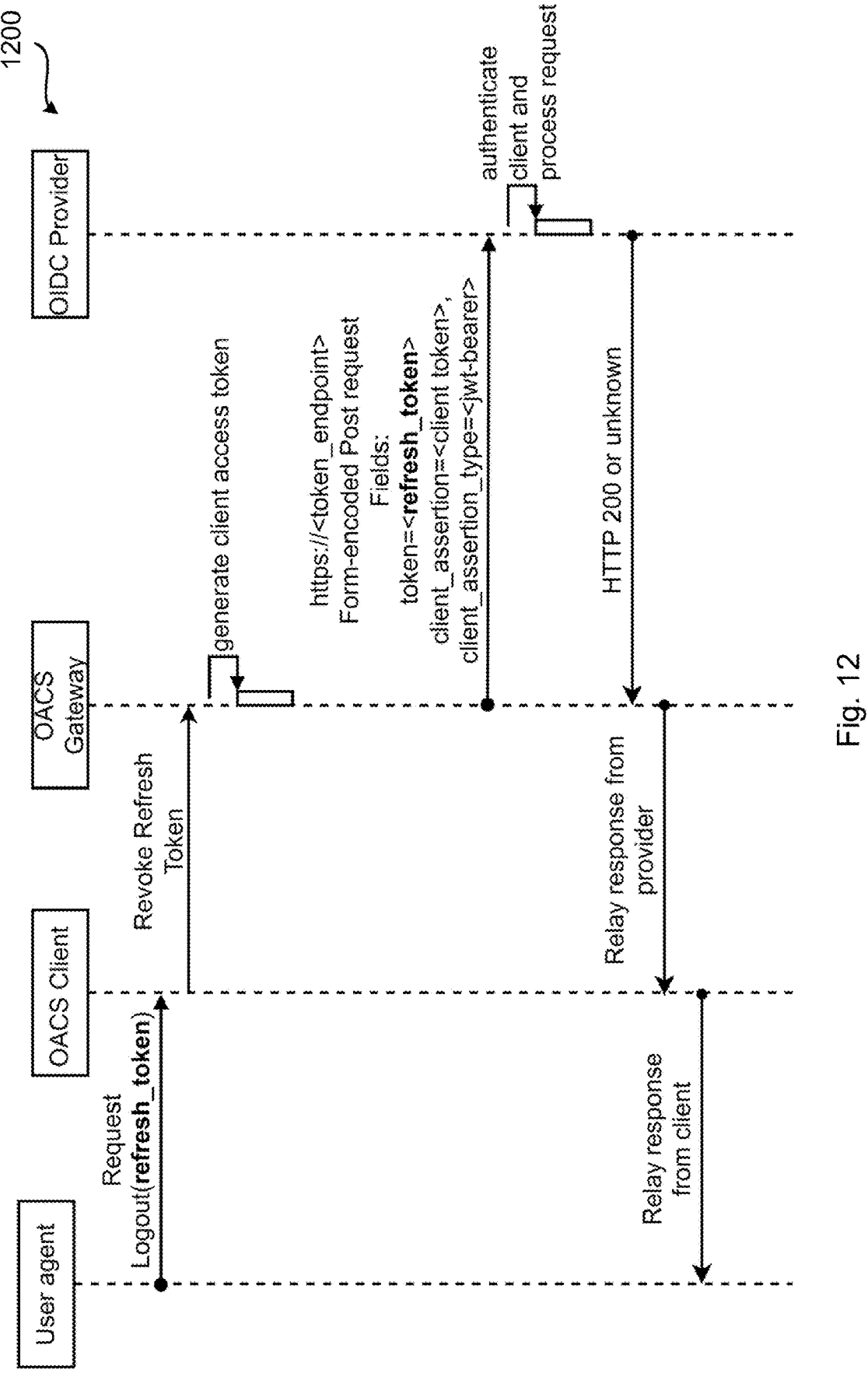

Reference is made to the block diagram 1100 of FIG. 11 and the signaling diagram 1200 of FIG. 12. The device 1110 comprises an electronic access control system 1120. The OACS gateway 1124 implements an OIDC client 1126.

S401. Logout: The end-user, via the user agent 1150 requests to be logged out.

S402. Revoke refresh_token: The OACS client 1122 requests the OACS gateway 1124 to initiate the token revocation, using the refresh token provided by the user agent 1150.

S403. Sign JWT: The OIDC client 1126 generates a base64 encoded representation of the header and payload which is then signed by the RoT 1128.

S404. Signature: The signature is returned and the signed JWT is assembled. This token can now be used to authenticate the OIDC client 1126 towards the OIDC provider 1140 via network interface 1130.

S405. HTTP response code: The OIDC provider 1140 responds with a HTTP response code 200 for success and any other response is considered a failure and the token is not revoked.

S406. Response: A response message is returned to inform about the result. The now revoked token cannot be used to get a new access_token and thus the user is considered to be logged out.

Ticket Usage Process

The process of using a service ticket starts when an external service API is called. The service ticket is passed with the request. The service ticket is forwarded to the next service as a string. Each service does a permission check at the beginning of a serving API call, expecting one of a set of approved features and permissions required to use that API. Every OACS feature set version is checked.

The integrity of the service ticket is confirmed by verifying the signature of the token and the expiration time. The service can verify the signature of the service ticket by sending it to OACS gateway over the D-Bus. In this case, if the service ticket is valid, the OACS gateway will return a confirmation that the service ticket is valid. If the service ticket has the right permissions, then the API call will resume, and the service ticket will be passed to the next service. Otherwise, it will result in an error being issued.

Task Authorization (Legacy) Process

Task authorization can be used to provide backwards compatibility with existing access systems. The OACS gateway is then provided with static legacy profiles. These could be JSON files that represent the traditional user roles through OACS access profiles. In this case, a user logs in as usual. The user is authenticated using a local user database. Once the user is authenticated and user roles have been determined, the OACS gateway can be used to authorize a task object. The request will have to be evaluated on a Common Gateway Interface (CGI) or application programming interface (API) end-point in order to determine the required feature and permission. A task object can then be authorized by requesting authorization for the feature and its permission using the established roles. If a legacy profile exists for the role and the task is authorized by it, a task object is generated and returned. It none of the roles assigned to the user permits the requested task, authorization fails.

Figure 13:
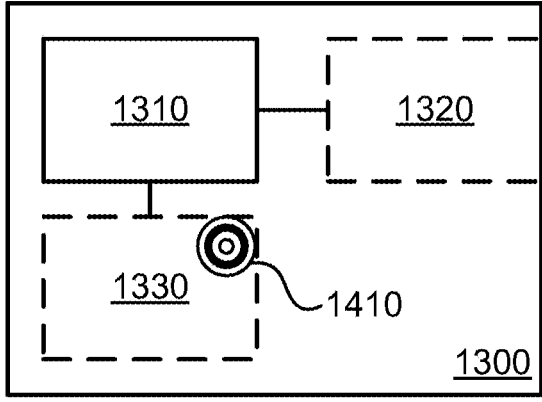
FIG. 13 is a schematic diagram showing functional units of an electronic access control system according to an embodiment.

FIG. 13 schematically illustrates, in terms of a number of functional units, the components of an electronic access control system 1300 according to an embodiment. Processing circuitry 1310 is provided using any combination of one or more of a suitable central processing unit (CPU), multiprocessor, microcontroller, digital signal processor (DSP), etc., capable of executing software instructions stored in a computer program product 1410 (as in FIG. 14), e.g. in the form of a storage medium 1330. The processing circuitry 1310 may further be provided as at least one application specific integrated circuit (ASIC), or field programmable gate array (FPGA).

Particularly, the processing circuitry 1310 is configured to cause the electronic access control system 1300 to perform a set of operations, or steps, as disclosed above. For example, the storage medium 1330 may store the set of operations, and the processing circuitry 1310 may be configured to retrieve the set of operations from the storage medium 1330 to cause the electronic access control system 1300 to perform the set of operations. The set of operations may be provided as a set of executable instructions.

Thus the processing circuitry 1310 is thereby arranged to execute methods as herein disclosed. The storage medium 1330 may also comprise persistent storage, which, for example, can be any single one or combination of magnetic memory, optical memory, solid state memory or even remotely mounted memory. The electronic access control system 1300 may further comprise a communications (comm.) interface 1320 at least configured for communications with other entities, functions, nodes, and devices. As such the communications interface 1320 may comprise one or more transmitters and receivers, comprising analogue and digital components. The processing circuitry 1310 controls the general operation of the electronic access control system 1300 e.g. by sending data and control signals to the communications interface 1320 and the storage medium 1330, by receiving data and reports from the communications interface 1320, and by retrieving data and instructions from the storage medium 1330. Other components, as well as the related functionality, of the electronic access control system 1300 are omitted in order not to obscure the concepts presented herein.

The electronic access control system 1300 may be provided as a standalone device or as a part of at least one further device. Thus, a first portion of the instructions performed by the electronic access control system 1300 may be executed in a first device, and a second portion of the of the instructions performed by the electronic access control system 1300 may be executed in a second device; the herein disclosed embodiments are not limited to any particular number of devices on which the instructions performed by the electronic access control system 1300 may be executed. Hence, the methods according to the herein disclosed embodiments are suitable to be performed by an electronic access control system 1300 residing in a cloud computational environment. Therefore, although a single processing circuitry 1310 is illustrated in FIG. 13 the processing circuitry 1310 may be distributed among a plurality of devices, or nodes. The same applies to the computer program 1420 of FIG. 14.

Figure 14:
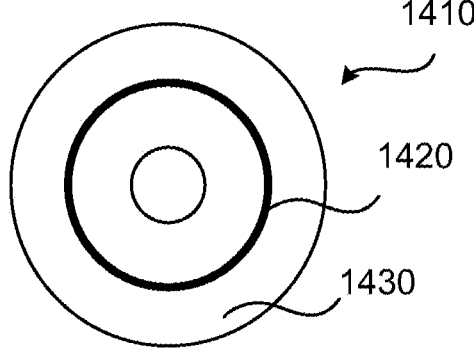
FIG. 14 shows one example of a computer program product comprising computer readable storage medium according to an embodiment.

FIG. 14 shows one example of a computer program product 1410 comprising computer readable storage medium 1430. On this computer readable storage medium 1430, a computer program 1420 can be stored, which computer program 1420 can cause the processing circuitry 1310 and thereto operatively coupled entities and devices, such as the communications interface 1320 and the storage medium 1330, to execute methods according to embodiments described herein. The computer program 1420 and/or computer program product 1410 may thus provide means for performing any steps as herein disclosed.

In the example of FIG. 14, the computer program product 1410 is illustrated as an optical disc, such as a CD (compact disc) or a DVD (digital versatile disc) or a Blu-Ray disc. The computer program product 1410 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420 is here schematically shown as a track on the depicted optical disk, the computer program 1420 can be stored in any way which is suitable for the computer program product 1410.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. An Open ID Connect electronic access control system (OACS) for a device, wherein the electronic access control system comprises at least one processor and a non-transitory memory storing instructions that, when executed by the at least one processor, cause the at least one processor to implement an OACS client and an OACS gateway to an OIDC provider, the OACS client and the OACS gateway being implemented by execution of the instructions, wherein the OACS gateway implements an OIDC client, and wherein the OACS gateway is configured to:

obtain, via the OACS client, a request for the OACS gateway to issue a service ticket for a user agent, the request comprising an indication that the user agent requests to access a service on the device, wherein the service is associated with a permission;

retrieve, via the OIDC client, a profile for the user agent and an access control list for the profile and the device from the OIDC provider;

responsive to having confirmed, by checking the access control list for the profile and the device, and by checking the profile itself, that the profile fulfils the permission to access the service on the device:

generate a service ticket that validates the user agent for a one-time access to the service, wherein the service ticket is a token that is signed by the OACS gateway; and provide, via the OACS client, the service ticket to the user agent.

2. The electronic access control system according to claim 1, wherein the OACS gateway is configured to:

obtain, via the OACS client, an authorization request for the user agent responsive to the user agent requesting to log in to the device; and authenticate the OIDC client towards the OIDC provider by providing, via the OIDC client, a signed token to the OIDC provider.

3. The electronic access control system according to claim 2, wherein the OACS gateway is configured to:

obtain, via the OIDC client and from the OIDC provider, a device code and a verification URL for the device, wherein the verification URL comprises an embedded user agent code that is paired with the device code; and provide, via the OACS client, the verification URL and the device code to a user client for authenticating the user agent.

4. The electronic access control system according to claim 3, wherein the OACS gateway is configured to:

obtain, via the OACS client, a request for a refresh token from the user agent, wherein the request comprises the device code;

retrieve, via the OIDC client, an access token and the refresh token for the user agent from the OIDC provider by providing the device code to the OIDC provider; and provide, via the OACS client, the refresh token to the user client.

5. The electronic access control system according to claim 4, wherein the request for the OACS gateway to issue the service ticket comprises the refresh token.

6. The electronic access control system according to claim 5, wherein a new refresh token is retrieved, via the OIDC client, from the OIDC provider together with the profile, and wherein the new refresh token is provided, via the OACS client, together with the service ticket to the user agent.

7. The electronic access control system according to claim 6, wherein the new refresh token is retrieved upon having verified the profile of the user agent on the access control list.

8. The electronic access control system according to claim 4, wherein the OACS gateway is configured to:

obtain, via the OACS client, a token revocation request for the user agent responsive to the user agent requesting to log out from the device, wherein the token revocation request comprises the refresh token.

9. The electronic access control system according to claim 8, wherein the OACS gateway is configured to:

authenticate the OIDC client towards the OIDC provider by providing, via the OIDC client, a signed token to the OIDC provider; and provide, via the OIDC client, the refresh token and the signed token to the OIDC provider.

10. The electronic access control system according to claim 9, wherein the OACS gateway is configured to:

obtain, via the OIDC client and from the OIDC provider, a response indicating that the refresh token has been revoked.

11. The electronic access control system according to claim 10, wherein the OACS gateway is configured to:

provide, via the OACS client, a response towards a user client that the refresh token has been revoked and that the user agent is logged out.

12. A method for operating an electronic access control system for a device, wherein the electronic access control system comprises an OACS client and an OACS gateway to an OIDC provider, wherein the OACS gateway implements an OIDC client, wherein the method is performed by the OACS gateway, and wherein the method comprises:

obtaining, via the OACS client, a request for the OACS gateway to issue a service ticket for a user agent, the request comprising an indication that the user agent requests to access a service on the device, wherein the service is associated with a permission;

retrieving, via the OIDC client, a profile for the user agent and an access control list for the profile and the device from the OIDC provider;

responsive to having confirmed, by checking the access control list for the profile and the device, and by checking the profile itself, that the profile fulfils the permission to access the service on the device:

generating a service ticket that validates the user agent for a one-time access to the service, wherein the service ticket is a token that is signed by the OACS gateway; and providing, via the OACS client, the service ticket towards the user agent.

13. A non-transitory computer readable storage medium comprising instructions for operating an electronic access control system for a device, wherein the electronic access control system comprises an OACS client and an OACS gateway to an OIDC provider, wherein the OACS gateway implements an OIDC client, the non-transitory computer readable storage medium comprising instructions which, when executed by one or more processors of the electronic access control system, cause the OACS gateway to:

obtain, via the OACS client, a request for the OACS gateway to issue a service ticket for a user agent, the request comprising an indication that the user agent requests to access a service on the device, wherein the service is associated with a permission;

retrieve, via the OIDC client, a profile for the user agent and an access control list for the profile and the device from the OIDC provider;

responsive to having confirmed, by checking the access control list for the profile and the device, and by checking the profile itself, that the profile fulfils the permission to access the service on the device:

generate a service ticket that validates the user agent for a one-time access to the service, wherein the service ticket is a token that is signed by the OACS gateway; and provide, via the OACS client, the service ticket towards the user agent.

* * * * *